(12) United States Patent
Krummel

(10) Patent No.: US 9,117,096 B2
(45) Date of Patent: Aug. 25, 2015

(54) PROTECTION OF SAFETY TOKEN AGAINST MALWARE

(71) Applicant: Wincor Nixdorf International GmbH, Paderborn (DE)

(72) Inventor: Volker Krummel, Paderborn (DE)

(73) Assignee: Wincor Nixdorf International GmbH (DE)

( * ) Notice: Subject to any disclaimer, the term of this patent is extended or adjusted under 35 U.S.C. 154(b) by 3 days.

(21) Appl. No.: 13/708,113

(22) Filed: Dec. 7, 2012

(65) Prior Publication Data

US 2013/0179940 A1 Jul. 11, 2013

(30) Foreign Application Priority Data

Dec. 8, 2011 (DE) .......................... 10 2011 056 191

(51) Int. Cl.
| | |
|---|---|
| *G06F 12/14* | (2006.01) |
| *G06F 21/85* | (2013.01) |
| *G06F 21/34* | (2013.01) |
| *G07F 19/00* | (2006.01) |

(52) U.S. Cl.
CPC ............... *G06F 21/85* (2013.01); *G06F 12/14* (2013.01); *G06F 21/34* (2013.01); *G07F 19/209* (2013.01)

(58) Field of Classification Search
CPC . G06F 12/1408; G06F 12/1416; G06F 15/17; H04L 9/0897; H04L 9/3234
USPC ......... 713/172, 173, 184, 185; 380/44; 726/9, 726/28, 30
See application file for complete search history.

(56) References Cited

U.S. PATENT DOCUMENTS

| | | | |
|---|---|---|---|
| 6,282,522 B1 | 8/2001 | Davis et al. | |
| 6,789,730 B1 | 9/2004 | Trelawney et al. | |
| 7,121,460 B1 | 10/2006 | Parsons et al. | |
| 7,272,723 B1 * | 9/2007 | Abbott et al. | 713/185 |
| 7,309,004 B1 | 12/2007 | Muschellack et al. | |
| 7,513,417 B2 | 4/2009 | Burns et al. | |
| 7,693,790 B2 | 4/2010 | Lawlor et al. | |
| 7,957,536 B2 | 6/2011 | Nolte | |
| 8,041,644 B2 | 10/2011 | Ogg et al. | |
| 2002/0038289 A1 | 3/2002 | Lawlor et al. | |

(Continued)

FOREIGN PATENT DOCUMENTS

| | | |
|---|---|---|
| DE | 10 2006 049 518 A1 | 4/2008 |
| DE | 10-2007-019541 A1 | 10/2008 |

(Continued)

OTHER PUBLICATIONS

International Search Report (in German with English Translation) for PCT/EP2011/051510, mailed Sep. 23, 2011; ISA/EP.

(Continued)

*Primary Examiner* — Eleni Shiferaw
*Assistant Examiner* — Paul Callahan
(74) *Attorney, Agent, or Firm* — Harness, Dickey & Pierce, P.L.C.

(57) ABSTRACT

Security token for the authentication of access to a self-service terminal, comprising an interface for a connection to the self-service terminal, comprising authentication information, characterized by a second interface that allows a connection of a memory stick the contents of which are made available to the self-service terminal, wherein access to the memory stick is dependent on the authentication information.

13 Claims, 1 Drawing Sheet

(56) References Cited

U.S. PATENT DOCUMENTS

| | | | |
|---|---|---|---|
| 2004/0014982 A1 | 1/2004 | Hoefle et al. | |
| 2004/0103317 A1 | 5/2004 | Burns | |
| 2004/0215564 A1 | 10/2004 | Lawlor et al. | |
| 2005/0015604 A1 | 1/2005 | Sundararajan et al. | |
| 2007/0288689 A1 | 12/2007 | Lu et al. | |
| 2008/0052453 A1* | 2/2008 | Cheng | 711/104 |
| 2008/0114983 A1 | 5/2008 | Sherkin et al. | |
| 2008/0133929 A1* | 6/2008 | Gehrmann et al. | 713/179 |
| 2009/0119221 A1 | 5/2009 | Weston et al. | |
| 2010/0114769 A1 | 5/2010 | Carpenter et al. | |
| 2010/0138485 A1 | 6/2010 | Chow et al. | |
| 2010/0146264 A1 | 6/2010 | Blume et al. | |
| 2011/0040984 A1 | 2/2011 | Nolte et al. | |
| 2011/0113067 A1 | 5/2011 | Homer | |
| 2011/0179485 A1 | 7/2011 | Le et al. | |
| 2011/0307703 A1 | 12/2011 | Ogg et al. | |
| 2012/0079563 A1* | 3/2012 | Green et al. | 726/3 |
| 2012/0102327 A1 | 4/2012 | Krummel et al. | |

FOREIGN PATENT DOCUMENTS

| | | |
|---|---|---|
| DE | 10-2008-060863 A1 | 6/2010 |
| EP | 0775992 A2 | 5/1997 |
| EP | 1612747 A1 | 1/2006 |
| GB | 2401462 A | 11/2004 |
| WO | WO-0048061 A1 | 8/2000 |
| WO | WO-2005/001629 A2 | 1/2005 |
| WO | WO-2008-003174 A1 | 1/2008 |
| WO | WO-2011-144488 A2 | 11/2011 |

OTHER PUBLICATIONS

Shamir, Adi, "Identity-Based Cryptosystems and Signature Schemes", Advances in Cryptology; Proceedings of CRYPTO 84, Lecture Notes in Computer Science, 1984, 7: pp. 47-53.

Boneh, Dan & Franklin, Matthew, "Identity-Based Encryption from the Weil Pairing", Advances in Cryptology-Proceedings of CRYPTO 2001, pp. 1-31.

Cocks, Clifford, "An Identity Based Encryption Scheme Based on Quadratic Residues", Proceedings of the 8th IMA International Conference on Cryptography and Coding, 2001, Communications-Electronics Security Group, Cheltenham, United Kingdom.

English Translation of the International Preliminary Report on Patentability (Chapter I of the Patent Cooperation Treaty) for PCT/EP2010/058480, issued Jan. 17, 2012; ISA/EP.

German Search Report (in German) for German Application No. 10 2009 032 355.4, dated Dec. 6, 2010.

Al-Riyami, S.S., Paterson, K.G., "Certificateless Public Key Cryptography", Advances in Cryptology—ASIACRYPT, 2003, pp. 1-40, XP002595551, DOI: 10.1007/b94617 (in English).

Joonsang Baek, Jan Newmarch, Reihaneh Safavi-Naini, Willy Susilo:, "A Survey of Identity-Based Cryptography", [Online] 2004, pp. 1-10, XP002595552, Proc. of Australian Unix Users Group Annual Conference, Retrieved from the Internet: URL: http://citeseerx.ist.psu.edu/viewdoc/download?doi=10.1.1.128. 6502&rep=rep1&type=pdf> [retrieved on Aug. 5, 2010] (in English).

International Search Report for PCT/EP2010/058480 (in English), mailed Sep. 10, 2010; ISA/EP.

A. Menezes et al., Handbook of Applied Cryptography, Chapter 9, "Hash Functions and Data Integrity", CRC Press, 1996.

A.S. Tanenbaum, Computer Networks, Fourth Edition, Sep. 8, 2002, pp. 161-181, XP002565530.

T. Dierks, et al., Network Working Group, "The Transport Layer Security (TLS) Protocol", Version 1.2, Aug. 2008, pp. 1-104, XP015060256.

International Preliminary Report on Patentability (Chapter I of the Patent Cooperation Treaty) for PCT/EP2011/051510 (in English), issued Aug. 21, 2012.

German Search Report for Application No. 10-2011-056-191.9 dated Oct. 10, 2012 (5 pages).

* cited by examiner

PROTECTION OF SAFETY TOKEN AGAINST MALWARE

CROSS-REFERENCE TO RELATED APPLICATIONS

This application claims priority to German Application No. 10 2011 056 191.9, filed on Dec. 8, 2011. The entire disclosure of the above application is incorporated herein by reference.

BACKGROUND

This section provides background information related to the present disclosure which is not necessarily prior art.

TECHNICAL FIELD

The invention relates to a system for authenticating a user at a data processing system. Specifically, the invention serves to authenticate the user at a monetary transaction device, self-service automat or automated teller machine (ATM). With data processing systems, in particular with data processing systems that are part of a monetary transaction device, a plurality of security aspects must be taken into account in order to ensure that these data processing systems cannot be manipulated by unauthorized persons. In particular the transmission of data, specifically program data, from a removable medium to the data processing system, and of data from a data processing system to a removable medium connected to this data processing system is to be securely prevented in the case of unauthorized users. It must be ensured that no type of "infected" storage media are used that can transmit a virus.

2. Discussion

With monetary transaction devices, data transmission of this kind must be stopped for unauthorized users in order to maintain data protection requirements and to prevent manipulations for security reasons. Known monetary transaction devices may be self-service devices in particular that comprise a plurality of electronic components. Such components are, for example, a money dispensing/deposit unit, a keypad, a card reader and writer, and other peripheral devices. These individual components are connected to the data processing system of the monetary transaction device by communications interfaces and data lines. Usually they are PCs that are equipped with standard interfaces (USB, FireWire, etc.) and on which standard operating systems run that are specially monitored and controlled. Each of these components processes and produces data, specifically operating protocols, trace data and error information. Normally these data are stored in a memory area of a permanent memory of the data processing system, specifically of a hard disc memory of the data processing system. For many reasons it makes sense to process and to analyze these data at an additional data processing system, specifically centrally at the maker of the monetary transaction device. An analysis of these data can be carried out, for example, on a laptop computer of a service technician with suitable software. It may be necessary to transmit these data with the aid of a plug-in flash memory, such as a flash memory with an integral USB interface, a USB stick, from the data processing system of a monetary transaction device to the additional data processing system such as the laptop computer of the service technician. To do this, the relevant data from the data processing system of the monetary transaction device are copied or moved into a memory area of the pluggable flash memory. However, data transmission of this type is not secure with conventional data processing systems so that each operator who has access to the data processing system of the monetary transaction device can copy these data. Consequently, improper use of these data cannot be excluded. Furthermore, even when transmitting data stored in a memory area of the pluggable flash memory to the data processing system of the monetary transaction device it should be ensured that this data transmission is permitted only for authorized users (details can be found in DE 102007019541 A1 the content of which is subsumed herein). Similar problems occur when other data carriers are used instead of the pluggable flash memory. To grant additional user rights with a data processing system, secure authentication of a user is necessary to grant this user preset user rights. These user rights can specifically prevent the running of application programs with which security-related settings of the monetary transaction device can be changed, or that have an effect on manipulating the monetary transaction device in a different way and/or may hinder the secure operation of the monetary transaction device.

For a total concept to secure an ATM, it is necessary to allow technicians authorized access to the internal components in different scenarios. The following scenarios are examples of such interventions:

1) Replacement of individual hardware components
2) Software updates
3) Carrying out other functions that require special authorization (e.g. replacing keys)

The following standards should be met in all these scenarios:

1) Checking authorization; unauthorized persons should in any case be prevented from being able to use this functionality. In order to be able to ensure this, cryptographic functions must be used to effectively prevent abuse.

2) No/few dependencies to other conditions; the definition of other, alien conditions such as monitoring the safe door leads to far-reaching dependencies that complicate the management of such operations. This leads to susceptibility to error and thus to high costs in system service and maintenance.

3) Fine-granularity when granting rights; the system should be flexible enough so that fine-grained rights can be granted for specific rights. The administration of rights should be carried out centrally in order to be able to obtain an overview of the current status at any time.

4) Traceability of actions; in retrospect it should be possible to trace what action was taken when, who took the action and the result of completing the action. This means specifically that authorization must be granted individually for each user.

All the properties described above require the use of a special security token, such as the Crypto Stick, that is connected over the USB interface to the PC.

A security token (simply: token) is a hardware component to identify and authenticate users.

Direct possession of the token is absolutely necessary in order to identify oneself as an authorized user.

A token is also described using the terms electronic key or chip key.

If necessary, additional features can be used to prevent abuse, possible ones include knowledge of a password or a PIN or biometric features of the user (finger print scanner in the USB stick). Security tokens can be personalized, they are then unambiguously assigned to one specific user. The inclusive technical term token describes all technologies in use equally and is not dependent on a specific form of hardware. It includes all objects that can store and transmit information for the purpose of identification and authentication. Smartcards are also tokens. USB tokens that are connected to a USB port have the advantages of a smartcard without requiring a card reader.

There are also tokens with or without contacts. As an additional security feature, a PIN and/or a challenge code must frequently be entered into the device.

Basically, the authentication process runs (schematically) as follows:

1. The user initiates the data exchange between token and check system by holding the token in front of a reading device, for example, or inserting it into the system.

2. The reading device identifies the token by its unique identification number(s), such as its type number, a media serial number, a bearer registration number and/or a user class number.

3. The data set read from the token is compared by the check system with appropriate local reference data according to a well-defined check procedure: authentication of the token is made using challenge-response authentication, possibly additional check data are queried for this as additional security features, for example a PIN is requested from the bearer of the token or a finger print, for example.

4. For security, the local reference data can be compared with additional reference data from a data base of a remote server (e.g. over a dedicated line or a secure dial-up line).

5. In the case of an invalid token or invalid additional reference data, the check system refuses additional attempts at access.

6. To track authentication, event data from the check process are transmitted back to the server.

7. The check system releases the use permitted to the bearer of the token, such as functions and/or data.

In order to simplify the deployment of technicians, the stick was previously given sufficient flash memory to have analysis programs available/to hand or to be able to extract log files from automats.

However, by providing memory of this kind, the problem arises that potential malware can be transferred to the automats by way of the security token, or it can execute a damaging function directly from the token. If one defines the token as necessary for the authorized completion of certain actions, this leads to a conflict regarding security requirements.

Even if the user is forbidden to use the memory, malware can use this memory undetected. Legal consequences for the maker cannot be excluded in such an environment.

SUMMARY OF THE INVENTION

An object of the present invention lies in solving the aforementioned problems so that the token cannot transmit any type of malicious software.

The proposal to solve this problem is the design of a security USB token without a permanently installed memory.

The token has available complete security functionality but does not offer any externally accessible memory. However, to give the technician the possibility of transmitting data, this token has as an option its own small USB hub that allows any memory stick to be plugged in. The security token is thus only an attachment to a regular memory stick to enable the security functions to be carried out. The advantage of this attachment is that the security functions can be secured without having to accept the risk of a malware attack. The technician can optionally use a regular USB memory stick.

To secure the optional memory against malware the following measures are taken:

1) The security token has a mechanism to administer the reading or writing rights on the memory stick. Control is handled by security tokens.

The security token only releases the memory for reading when there is authorization for this process. Recourse can also be had to already established cryptographic procedures such as challenge-response with a server or the user, digital signatures, etc.

2) As a further refinement, mechanisms can be used that forward the data to the optional memory stick only when they are correctly signed. This would effectively eliminate files from insecure sources.

3) Additionally, the optional memory in the security token can be encrypted in order to ensure the confidentiality of the data.

In detail, it is a security token for authentication for access to a self-service terminal comprising an interface for a connection to the self-service terminal. This interface is usually a USB interface (Universal Serial Bus) to all possible specifications (USB 1.0, 2.0, 3.0, etc.) or over FireWire, etc. However, it can also be a wireless interface. The security token further comprises authentication information. This authentication information is additional information that does not absolutely have to be identical to the information that implements the functionality of the security token. It can, however, be identical and assume both functions. The requested authentication information serves to control access to a second interface that permits a memory stick to be connected, the content of which is made available to the self-service terminal wherein the access to the memory stick depends on the authentication information. This second interface is usually also a USB interface that preferably provides a USB hub to which a USB memory stick is connected. A USB hub is a USB device that distributes the USB signal to several ports. Thus, several second interfaces can be available.

The authentication information is responsible for access to the interface, which access is controlled in such a way that the interface to the USB memory stick is released to read and/or to write when read and/or write authentication information for this process is provided. Thus, the read and/or write authentication information can be acquired through a challenge-response procedure with a server connected over a network or the user. The user, for example, is prompted at the ATM to enter the correct answer to a question. The challenge-response question can also be asked over a server to which the ATM is connected. In this way a third party, for example, can release access for the maintenance engineer. The third party sits at a remote server, for example, in a computer center and receives the information about the insertion of the USB memory stick and he then has to release said stick.

Access to the memory stick can also be made dependent on digital signatures that are stored on the stick, for example, biometric procedures are also conceivable in which, for example, a fingerprint of the maintenance engineer is read. To do this, a fingerprint reading device is integrated into the token.

In a further embodiment, the data are only forwarded to the memory stick when the signature of the data agree with the authentication information in order to prevent effectively the reading and/or saving of data and in particular files from insecure sources. It is conceivable that the inspection takes place at block levels or at the file level. In the inspection at the block level, a check via the security token is made for each block transmitted that originates from the memory stick. Each block has additional information from which the signature is recognizable. Alternatively, it is naturally conceivable that each block is encrypted, and by encryption it can be seen whether the information is reliable or not. It is also conceivable that a plurality of blocks is encrypted or signed so that the load for the processor or the processing unit on the security token is reduced. In an alternative embodiment, the security token provides a virtual file system that is ultimately an image of the file system of the memory stick, wherein only the files on the file system are displayed that have a reliable signature. In this way the files that can be displayed are filtered. In an alternative embodiment, it is similarly conceivable that when the memory stick is inserted, the controller runs a check of all files, or blocks, that are saved on the memory stick in order to ascertain the reliable files and in future permits access only to the blocks, or files, whose authentication was recognized. In order to ensure this, it usually requires logic on the memory stick that can interpret the file system of the USB stick, or sticks, in order to recognize which files are signed or correctly encrypted.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
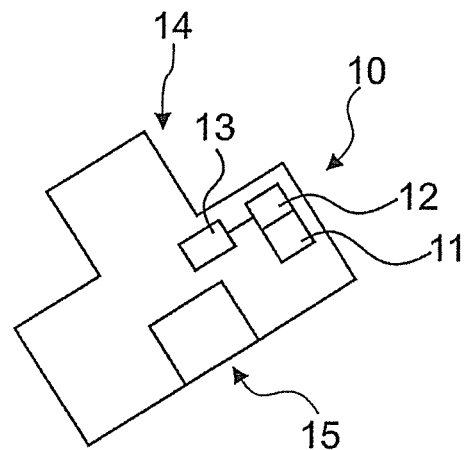
FIG. 1 shows a security token with a USB connection and a connection for a USB memory stick.
Figure 2:
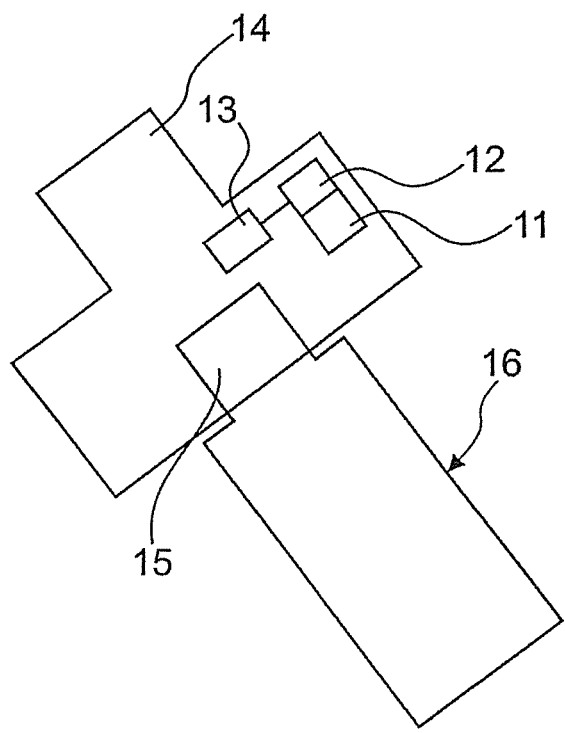
FIG. 2 shows a security token from FIG. 1 into which a USB memory stick has been inserted.

FIG. 1 shows a security token 10 that administers authentication information 11. The memory stick 10 is a USB version in the preferred embodiment that has a USB plug 14 with which the connection is made to a computer. A housing adjoins the plug. There is a socket 15 in the housing for connecting a memory stick that is suitable to receive a USB memory stick 16, wherein the controller 13 can provide a USB hub. Technically, the controller 13 is capable of analyzing the data traffic and the data on the USB stick.

The authentication information 11 is administered by a control unit 13 and serves to control access to the memory stick 16. As was described above, read/write access is controlled using the authentication information. Furthermore, additional authentication information 12 is filed that usually controls access to the self-service terminal. Only if the authentication information 12 is correct, does the self-service terminal permit access to components and software. Basically it is not out of the question that authentication information 12 and 13 are identical.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A security token for the authentication of access to a self-service terminal, the security token comprising:
    a first interface for a connection to the self-service terminal;
    authentication information; and
    a second interface that allows a memory stick to be connected to the security token to make contents of the memory stick available to the self-service terminal, where access to the memory stick is a function of the authentication information;
    wherein the first interface and the second interface are both USB/Universal Serial Bus;
    wherein the security token is devoid of rewritable memory;
    wherein the security token is without externally accessible memory; and
    wherein access to the memory stick when connected to the second interface is controlled by the security token by controlling the second interface such that the second interface is accessible for reading and writing only when the authentication information is provided, in the absence of the authentication information having been provided the second interface is not accessible and the memory stick is not visible to an operating system of the self-service terminal.

2. The security token according to claim 1, wherein the second interface provides a USB hub to which a USB memory stick can be attached.

3. The security token according to claim 1, wherein the reading and/or writing authentication information is obtained by a challenge-response procedure with a server connected over a network or the user, and/or using digital signals and/or biometric procedures.

4. The security token according to claim 1, wherein a control mechanism of the security token is configured in such a manner that data is forwarded to the memory stick only if a signature of the memory stick agrees with the authentication information in order to prevent the reading and/or storage of data and in particular files from insecure sources.

5. The security token according to claim 1, wherein data are encrypted and/or decrypted when reading/or writing using the authentication information.

6. A security token for authentication of access to a self-service terminal, the security token comprising:
    a first universal serial bus (USB) interface configured to connect with the self-service terminal;
    a second USB interface configured to connect with a memory stick;
    a control unit; and
    authentication information included with the security token that is administered by the control unit by controlling the second USB interface of the security token for controlling access to the memory stick by the self-service terminal when the memory stick is connected to the security token and the security token is connected to the self-service terminal, when the authentication information is valid the control unit permits the self-service terminal to read and write to the memory stick, in the absence of valid authentication information the second USB interface is not accessible and the memory stick is not visible to an operating system of the self-service terminal;

wherein the security token is devoid of rewritable memory; and wherein the security token is without externally accessible memory.

7. The security token of claim 6, wherein the security token is an attachment to the memory stick to restrict or grant access to the memory stick depending on validity of the authentication data.

8. The security token of claim 6, wherein the security token is a hardware component.

9. The security token of claim 6, wherein the reading and/or writing authentication information is acquired through a challenge-response procedure with a server connected over a network.

10. The security token of claim 6, wherein the reading and/or writing authentication information is acquired through a challenge-response procedure with a user.

11. The security token of claim 6, wherein the reading and/or writing authentication information is acquired by a challenge-response procedure including biometrics.

12. The security token of claim 6, wherein the reading and/or writing authentication information is acquired by a challenge-response procedure using digital signals.

13. A security token for authentication of access to a self-service terminal, the security token comprising:

a first universal serial bus (USB) interface configured to removably connect to the self-service terminal;

a second USB interface configured to removably connect to a memory stick including a memory module readable by the self-service terminal;

a storage unit with authentication information stored therein;

a control unit configured to control the second USB interface, with the security token connected to the self-service terminal at the first interface, the control unit grants a user of the self-service terminal access to the memory stick and data stored in the memory module thereof if personal identification information entered by the user at the self-service terminal positively corresponds with the authentication information stored in the storage unit, in the absence of the authentication information having been provided the second USB interface is not accessible and the memory stick is not visible to an operating system of the self-service terminal;

wherein the security token is devoid of rewritable memory; and wherein the security token is without externally accessible memory.

* * * * *